United States Patent [19]

Tuley et al.

[11] 4,214,852
[45] Jul. 29, 1980

[54] VARIABLE TURBINE VANE ASSEMBLY

[75] Inventors: Eugene N. Tuley, Hamilton; Delmer H. Landis, Jr., Loveland; Paul W. Lozier, North Bend, all of Ohio

[73] Assignee: General Electric Company, Cincinnati, Ohio

[21] Appl. No.: 898,248

[22] Filed: Apr. 20, 1978

[51] Int. Cl.² ............................ F01D 5/18; F01D 9/04
[52] U.S. Cl. ..................................... 415/115; 415/159
[58] Field of Search ............... 415/115, 116, 159, 160, 415/161, 175, 180, 155, 162, 189; 416/207

[56] References Cited

U.S. PATENT DOCUMENTS

| | | | |
|---|---|---|---|
| 2,862,654 | 12/1958 | Gardiner | 415/161 |
| 2,950,084 | 8/1960 | Perry | 415/180 |
| 3,224,194 | 12/1965 | DeFeo et al. | 415/160 |
| 3,367,628 | 2/1968 | Fitton | 415/115 |
| 3,471,126 | 10/1969 | Abild | 415/134 |
| 3,558,237 | 1/1971 | Wall | 415/115 |
| 3,584,458 | 6/1971 | Wetzler | 415/115 |
| 3,663,118 | 5/1972 | Johnson | 415/115 |
| 3,756,744 | 9/1973 | Braikevitch | 416/207 |
| 3,990,810 | 11/1976 | Amos et al. | 415/161 |
| 3,999,883 | 12/1976 | Nordenson | 415/160 |

FOREIGN PATENT DOCUMENTS

| | | | |
|---|---|---|---|
| 1120819 | 12/1961 | Fed. Rep. of Germany | 415/160 |
| 1283852 | 11/1968 | Fed. Rep. of Germany | 416/207 |
| 959142 | 5/1964 | United Kingdom | 415/189 |

*Primary Examiner*—Everette A. Powell, Jr.
*Assistant Examiner*—A. N. Trausch, III
*Attorney, Agent, or Firm*—Robert C. Lampe, Jr.; Donald W. Walk; Derek P. Lawrence

[57] ABSTRACT

A turbine assembly is provided by which a variable area turbine vane may be cantilever mounted from an outer structural frame and further supported by an inner structural frame. The vane includes an inner trunnion about which is installed an inner band sector to partially define a flow path through the turbine. The band sector is provided with a hole which receives the trunnion. Once the vane is cantilevered from the outer frame and the band sector installed, an inner annular frame is slid under the vane trunnion to align a hole in the frame with the trunnion. A generally cylindrical trunnion extension is inserted through the frame hole and over the end of the trunnion, and then attached to the trunnion through a bolted connection. The extension is journaled for rotation within the inner structural frame hole. Passageways are provided to route cooling air from the vane into the structural frame to provide cooling of the band sector. Such a structure eliminates the need for expensive uniballs or matched assembly halves at the inner end of the turbine vanes.

4 Claims, 5 Drawing Figures

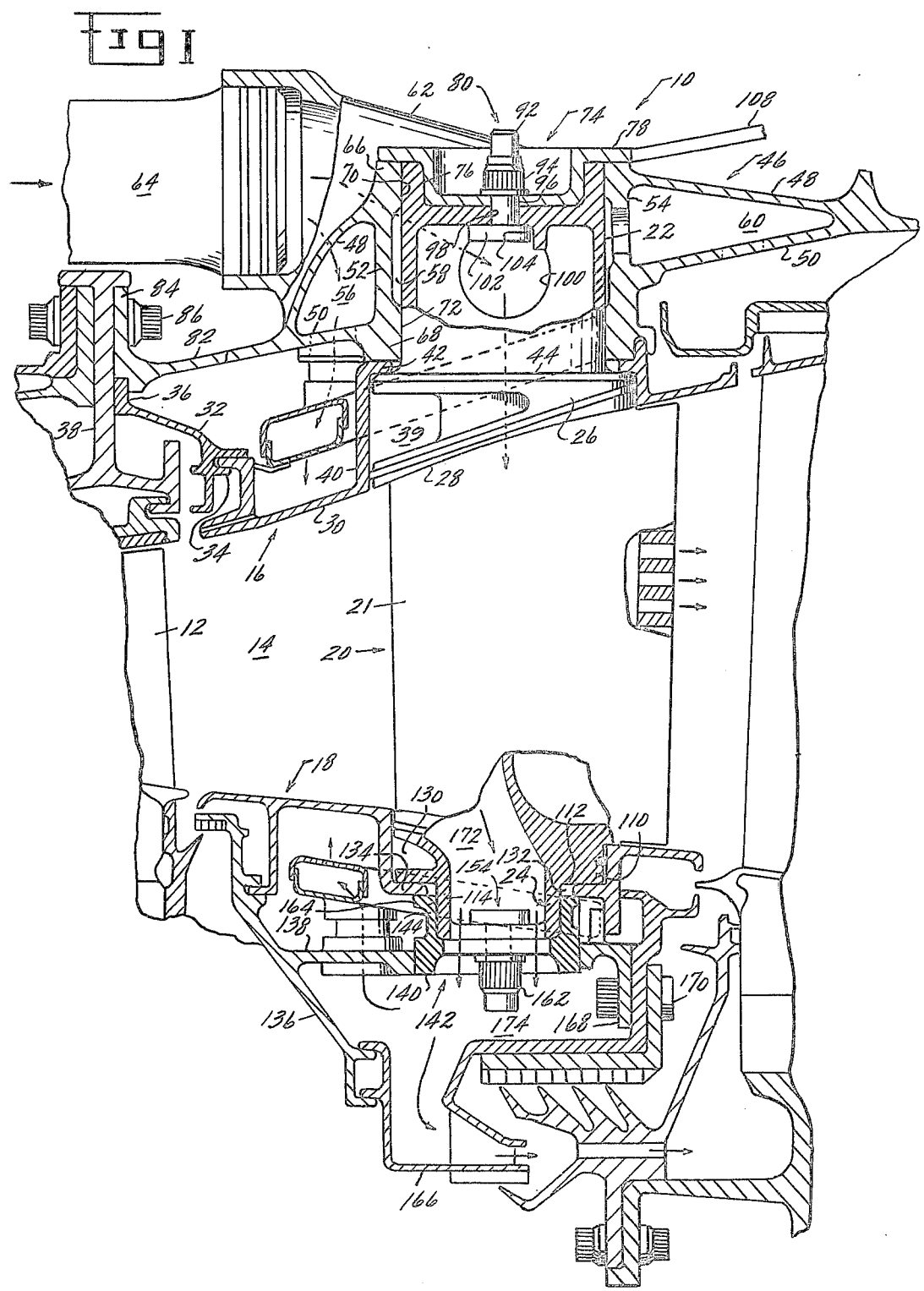
Fig I

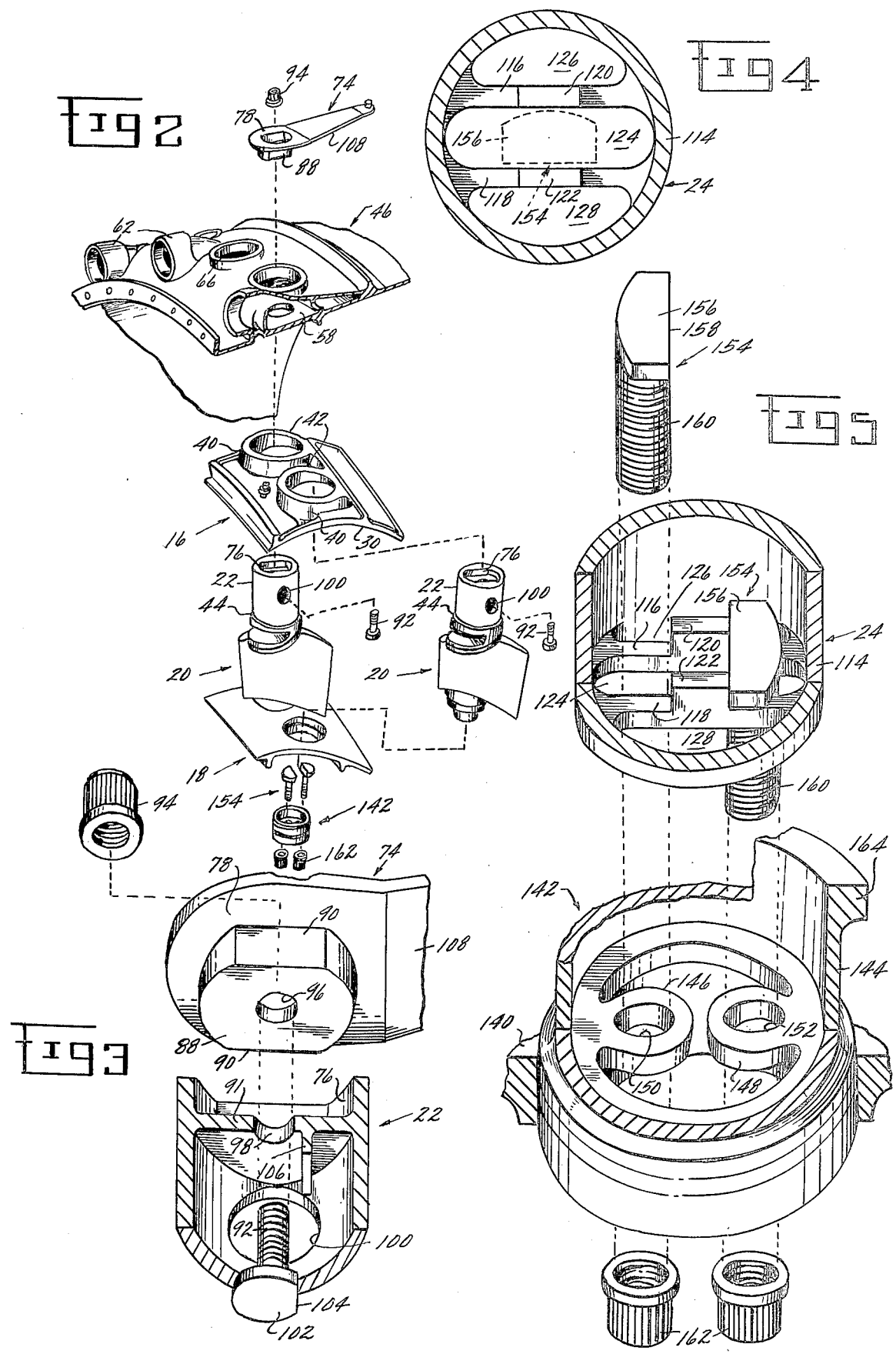

VARIABLE TURBINE VANE ASSEMBLY

BACKGROUND OF THE INVENTION

This invention relates to gas turbines and, more particularly, to a method and apparatus for assembling a variable area turbine.

It is by now well understood that in gas turbine engines energy is added to the air through the processes of compression and combustion, while energy is extracted by means of a turbine. In a turbofan engine, compression is accomplished sequentially through a fan and thereafter through a multistage compressor, the fan and compressor being independently driven by a high pressure and a low pressure turbine, respectively, through concentric shaft connections. Combustion occurs between the multistage compressor and the high pressure turbine. Since the energy available to the turbines far exceeds that required to maintain the compression process, the excess energy is exhausted as high velocity gases through one or more nozzles at the rear of the engine to produce thrust by the reaction principle.

Since the fan and compressor are on separate concentric shafts and are driven by separate, axially spaced turbines, a means for regulating their relative rotational speeds is desirable for performance optimization. Further, it becomes desirable to control the relative amounts of energy added by the fan and compressor which, in turn, are controlled by how much energy is extracted by their respective turbines. It can be appreciated that the faster the fan or compressor rotates, the more air it pumps, and vice versa. Furthermore, it is recognized that if a stage of stationary turbine vanes may be made to provide a variable flow area through the turbine by making the vanes rotatable about their respective longitudinal axes, the energy extraction characteristics of either the high or low pressure turbines may be modulated. Thus, if the capability of the high pressure turbine to extract energy was reduced, more energy would be available to the low pressure turbine and the fan could be driven at a higher rotational speed relative to the compressor, and vice versa. This ability to regulate the relationship between fan and compressor rotational speeds is extremely important in designing the most efficient engine over a range of operating conditions. Such optimized engines have recently been referred to as variable cycle engines and are characterized as possessing variable geometry components in order to optimize performance for both subsonic and supersonic cruise, for example. It is characteristic of some of these variable cycle engines that both the high and low pressure turbines are of the variable area variety for maximum modulation of energy extraction.

Additionally, it has been the experience that when it becomes necessary to design a close-coupled, fully variable, single-stage, low-pressure turbine, two structural characteristics usually results. First, the variable area vanes are cantilevered from a structural frame using cylindrical trunnions on the outer end of the vanes, and the trunnions are installed by sliding them radially outwardly through holes in the frame which journal the trunnion for vane rotation. The second characteristic is a result of the first. That is, the vane inner support structure must be put on in two halves, one half of which is inserted from ahead of the vane row and the other half which is inserted from the rear, capturing the vane ends therebetween. On one particular engine, this was done with two matched inner structure halves each containing 42 matched hemispherical impressions to entrap 42 uniballs, one on the end of each of 42 vanes, therebetween. This proved to be a very expensive configuration which was not amenable to mass production.

Therefore, a turbine structure is required which can support the inner ends of variable area turbine vanes which are cantilevered from an outer structural frame and which does not require the use of expensive uniballs and matched assemblies.

SUMMARY OF THE INVENTION

Accordingly, it is the primary object of the present invention to provide a turbine assembly in which variable area vanes are supported by means other than uniballs or matched assembly halves.

It is another primary object of the present invention to provide a relatively inexpensive structure for supporting the vanes of a variable area turbine.

It is yet another object of the present invention to provide an improved method for assembling a turbine of the variable area variety.

These and other objects and advantages will be more clearly understood from the following description, drawings and specific examples, all of which are intended to be typical of rather than in any way limiting to the scope of the present invention.

Briefly stated, the above objectives are accomplished in an assembly wherein a row of variable area turbine vanes are cantilivered from an outer structural frame which provides the primary means for retention. An inner structural frame provides additional support. Each vane includes an airfoil portion which transists into trunnions at both ends. The outer trunnion is inserted into a structural cooling air manifold which functions in the manner of a turbine frame, and is journaled for rotation therein. An inner band sector is installed around the inner trunnion by inserting the trunnion through the holes in the band sector. A number of these band sectors are arranged in a circle to partially define the flow path through the turbine. An inner annular frame is installed by sliding it beneath the ends of the vane inner trunnions and the inner frame is provided with a circumferential array of holes which are aligned with the inner trunnions. In order to provide structural support between the vanes and inner frame, a generally cylindrical trunnion extension is inserted through each frame hole and over the end of the associated trunnion and then attached to its respective trunnion through a bolted connection. The extension, rather than the trunnion, is then captured by the hole and journaled for rotation. Passageways are provided to route cooling air from the cooling air manifold through the vanes and inner trunnion extensions to provide cooling of the inner band sectors. A structurally unique connection between the vane inner trunnion and the trunnion extension facilitates installation while leaving adequate space for the internal passage of cooling air.

BRIEF DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given by way of example with the accompanying drawings in which:

FIG. 1 is a partial cross-sectional view of the low pressure turbine portion of a gas turbine engine incorporating the present invention;

FIG. 2 is an exploded view, in trimetric projection, illustrating the assembly of the turbine of FIG. 1;

FIG. 3 is an enlarged exploded view, in trimetric projection and partial cross section, depicting the outer end of a representative variable area vane of the present invention in greater detail;

FIG. 4 is a view looking upward at the end of the inner trunnion of a representative variable area turbine vane; and FIG. 5 is an enlarged exploded view, in trimetric projection and partial cross section, depicting in greater particularity the assembly of the turbine of the present invention.

DESCRIPTION OF THE PREFERRED EMBODIMENT

Referring to the drawings wherein like numerals refer to like elements throughout, attention is first directed to FIG. 1 wherein a portion of a variable area turbine, designated generally at 10 and incorporating the present invention is diagrammatically shown in partial section. Turbine 10 comprises the low pressure turbine of a gas turbine engine of the turbofan variety, though it is understood that the term "turbine" as used herein includes high pressure turbines, low pressure turbines and any other variety of machine which extracts energy from a motive fluid by means of blades or vanes. High energy gases of combustion exiting a row of rotating turbine buckets 12, only one of which is shown for simplicity, enter a flow path 14 defined between an outer band made of a number of annular sectors 16 forming a complete circle and an inner band, also preferably made of a number of annular sectors 18, forming a circle concentric with the outer band. Between the bands and spanning flow path 14 is a row of circumferentially spaced, variable area turbine vanes 20, again only one of which is shown for simplicity. Each vane is provided with an airfoil portion 21 of a known air-cooled variety supported by integral cylindrical trunnions 22, 24 at its outer and inner ends, respectively.

Directing attention now to the structure associated with the outer end of vane 20 by which the vane is cantilevered and through which cooling air is routed, it will be noted that each vane is provided with a cylindrical collar 26 between airfoil portion 21 and trunnion 22, the inner surface 28 of which is contoured to partially define flow path 14 through the vanes in cooperation with inner face 30 of outer band sector 16. Band sectors 16 are restrained by outer band support 32 through a sliding tongue-and-groove connection at 34, the outer band support having at its forward end a radially outwardly extending flange 36 which, in turn, is attached to a rigid annular high pressure turbine casing structure 38. Each outer band sector 16 is provided with at least one recessed cavity 39 defined by cylindrical wall portion 40 which is truncated at its inner end to match the contour of inner surface 28 of collar 26 and inner face 30 of its respective sector. Annular flange 42 partially closes the base of each cavity and provides a seat for the step diameter at 44 between collar 26 and trunnion 22 to radially position vane 20 within cavity 39.

Surrounding the circle of outer band segment 16 is an annular structural bleed manifold 46 which, in the preferred embodiment of FIGS. 1 and 2, comprises one example of a structural frame having as an additional feature means for routing and distributing cooling fluid to the air-cooled vanes 20. This manifold 46 is described in greater particularity in copending U.S. patent application Ser. No. 898,060, Tuley et al, entitled "Structural Cooling Air Manifold For A Gas Turbine Engine," which is assigned to the assignee of the present invention and the subject matter of which is incorporated herein by reference. Briefly, this structural bleed manifold is an integral casting which retains vanes 20 in their correct position and reacts the high gas loadings upon airfoils 21. Manifold 46 comprises two radially spaced thinly cast walls 48, 50 and a pair of internal stiffening ribs 52, 54 which extend therebetween to define three axially spaced annular plenum chambers 56, 58 and 60. Associated with outer wall 48 are a plurality of circumferentially spaced cylindrical inlet ports 62 which project axially forward and fluidly communicate with a coolant fluid source, such as the intermediate stages of an axial flow compressor, from which relatively cool air is bled and routed rearwardly through bleed conduit 64. This bleed air is distributed circumferentially throughout the annular plenum chambers to provide a source of coolant for each vane.

Each vane is journaled for rotation about its longitidinal axis within structural manifold 46 by means of pairs of aligned embossments 66, 68 of generally circular shape which are machine-bored to provide bearing seats 70, 72, respectively, sized to receive vane trunnions 22. Each vane is restrained by means of diameter step 44 and a dished vane lever 74 which is inserted into a recess 76 at the outer end of each trunnion and which is provided with a generally circular flange 78 which overhangs embossments 66. Vane lever 74 is attached to trunnion 22 by means of bolted connection 80 as shown.

The manifold 46 also includes an axially projecting extension 82 which may be part of the casting or an addition which is welded thereto and which terminates in a circular flange 84. Flange 84 is secured to the rigid, high pressure turbine casing structure 38 by a circle of bolts 86 while simultaneously capturing flange 36 of the outer band support as illustrated.

The variable area turbine vanes 20 are thus cantilevered from the outer structural frame (bleed manifold 46) and are retained therin in a manner which permits rotation about their longitudinal axis as is best shown in FIGS. 2 and 3. Basically, each vane is installed in the turbine assembly by inserting its outer trunnion 22 into an outer band sector 30 and, in particular, through a cavity formed by cylindrical wall 40 and end flange 42. With the vane trunnion 22 then inserted into a pair of aligned bearing seats 70, 72, of manifold embossments 66, 68, respectively, collar 26 seats against flange 42 at diameter step 44, thus capturing the band sector 30 between the vane collar 26 and manifold embossment 68 to restrict radially outward movement of the vane.

Vane lever 74 is provided with a dished portion 88 of generally circular profile, but with two flat sides 90 (FIG. 3), which is tightly fitted into the similarly contoured recess 76 and which bottoms against recessed trunnion end cap 91. Flange 78 thus overhangs the outer end of trunnion 22 and embossment 66 (FIG. 1) which are machined flat. The vane lever 74 is secured to the trunnion 22 by means of a bolt 92 and nut 94 which clamp the dished portion 88 of the vane lever and recessed end cap together through aligned bolt holes 96, 98, respectively. The bolt is inserted through a coolant entry hole 100 (FIG. 2) by which cooling air enters the interior of the vane from plenum chamber 58. A D-shaped bolt head 102 has a flat side 104 which abuts stop 106 projecting inwardly from cap 91 to prevent the bolt from turning as nut 94 is torqued. Thus, structural bleed manifold 46 is captured between vane lever flange 78, which is bolted to the vane, and vane step diameter 44 (in combination with band sector flange 42) to provide cantilevered support of the vane and to locate the vane with respect to rigid engine structure. The radial distance between embossments 66 and 68 should be such that when vane lever 74 is securely bolted to the end of vane trunnion 22, the band sector flange 42 and the manifold are not so tightly sandwiched between diameter step 44 and vane lever flange 78 as to prevent rotation of the vane trunnion 22. A vane lever arm 108 attached to a known variety of actuator imparts rotation to the vane which is journaled by bearing surfaces 70, 72.

Additional support for the radially inner end of each vane will now be described with particular reference to FIGS. 1, 2, 4 and 5. First, it is to be noted that, analogous to the vane outer end, the inner end is also provided with a generally cylindrical flow path defining collar 110 between airfoil portion 21 and cylindrical trunnion 24, the transition between the collar and trunnion occurring at diameter step 112. Referring more particularly to FIGS. 4 and 5, trunnion 24 is shown to comprise a generally hollow cylindrical wall 114, the end of which is provided with two internal spaced-apart webs 116, 118 each having an inwardly extending shoulder 120, 122, respectively, proximate the midspan of each web. The webs, therefore, in cooperation with wall 114, define within the interior end of the trunnion an oval hole 124 flanked by D-shaped holes 126, 128.

Once the vanes have been cantilever mounted from their outer end, the inner band sectors 18 are installed over the trunnions to form a circle partially defining flow path 14. Each trunnion is inserted into a generally truncated cylindrical cavity 130 formed in a band sector and through a hole 132 at the base thereof defined by circular flange 134 so that flange 134 is seated against diameter step 112. Thereafter, an annular inner structural frame comprising, in the present embodiment, forward inducer structure 136 is installed by sliding it under the end of trunnions 24.

The inducer structure includes an annular ring 138 having a circle of circumferentially spaced round holes 140 of a diameter greater than, but in general alignment with, trunnions 24. A generally cylindrical trunnion extension 142 is inserted into each hole 140 and over the end of each trunnion 24 as illustrated, the inner diameter of the extension being substantially the same as that of the trunnion. As is best shown in FIG. 5, the trunnion extension 142 comprises a generally hollow cylindrical wall 144 having a pair of inwardly projecting circular lugs 146, 148, each having a hole 150, 152, respectively, therethrough which are in general alignment with those portions of oval hole 124 in the base of the trunnion outwardly of shoulders 120, 122.

In order to attach the extension to the trunnion, a pair of lug bolts 154 having D-shaped heads 156 are inserted head first upwardly through the base of the trunnion as shown in FIG. 4, the width of the head being small enough to permit its passage between webs 116, 118. After insertion, each bolt is turned 90° and allowed to drop against the webs with the flat sides 158 of the heads opposing each other and in abutment with the pair of shoulders 120, 122 which restrain the bolts against rotation. Extensions 142 are then inserted over the base of the trunnions so that the bolt shanks 160 drop through lug holes 150, 152. Nuts 162 are then threaded onto the bolts so that the webs 116, 118 and lugs 146, 148 are then captured between the bolt heads and nuts to create a rigidly attached extension of the inner trunnions. This configuration is shown schematically in the exploded view of FIG. 2. Since the outer diameter of each extension is substantially the same as the hole 140 in which it is inserted, the vanes are journaled for rotation at both ends. An outwardly projecting flange 164 near the top of each extension, in cooperation with diameter steps 112, capture the inner band segments when the extensions are bolted to the trunnions. Thereafter, inducer 166 is attached to annular flange 168, formed along the aft edge of ring 138, by a circle of bolts 170 to complete the inner structural frame.

In operation, cooling air from bleed manifold 46 is routed through the vanes via internal passages 172 to provide cooling functions in a manner described in copending U.S. Patent Application Ser. No. 898,061, Landis et al, entitled "Turbine Band Cooling System," which is assigned to the assignee of the present invention and the subject matter of which is incorporated herein by reference. Holes 126, 128 in the base of the trunnions, and the hollow interior of the extension which is not occupied by lugs 146, 148, provide one example of means for routing the cooling fluid through the trunnion and extension into an interior structural frame coolant chamber 174.

It should be obvious to one skilled in the art that certain changes can be made to the above-described invention without departing from the broad inventive concepts thereof. For example, the structure which facilitates the installation of the inner ends of the variable vanes is equally adaptable to turbines of the cooled and non-cooled variety. It is intended that the appended claims cover this and all other variations of the present invention's broader inventive concepts.

Having thus described the invention, what is claimed as novel and desired to be secured by Letters Patent of the United States is:

1. A turbine assembly comprising:
    a vane having a trunnion on one end of a first diameter;
    a band which is inserted around the trunnion to define a flow path through said turbine;
    a structural frame spaced radially from the end of the trunnion, said frame having a hole therethrough of a second diameter in general alignment with said trunnion; and
    a generally cylindrical trunnion extension having an inner diameter substantially equal to said first diameter and into which the trunnion is inserted, and having an outer diameter substantially equal to said second diameter, and which is journaled for rotation within said structural frame hole; and
    means for attaching said extension to the trunnion;
    said trunnion being a cylinder having an inner wall and two ends, the end remote from the vane being provided with two internal, spaced-apart webs each having a shoulder proximate the midspan of the web;
    said trunnion extension being a generally hollow cylinder having a pair of projecting lugs, each provided with a hole in general alignment with the space between the two webs outwardly of said shoulders; and said attaching means comprising a pair of bolts, each having a flat-sided head which abuts said shoulders to prevent turning thereof and a shank which passes through the space between the two webs and through a hole in one of the lugs, and nuts which are threaded onto said bolts to capture the webs and lugs therebetween.

2. The turbine assembly as recited in claim 1 wherein the width of the bolt head is less than the space between webs.

3. The turbine assembly as recited in claim 1 wherein said band comprises a plurality of sectors arranged in a circle, each of said sectors having a hole therethrough into which said trunnion is inserted, wherein said trunnion is of stepped diameter and wherein said each sector is captured between the diameter step and said trunnion extension.

4. The turbine assembly as recited in claim 1 further comprising means for routing cooling fluid through said trunnion and said trunnion extension into said frame.

* * * * *